Patented Apr. 17, 1923.

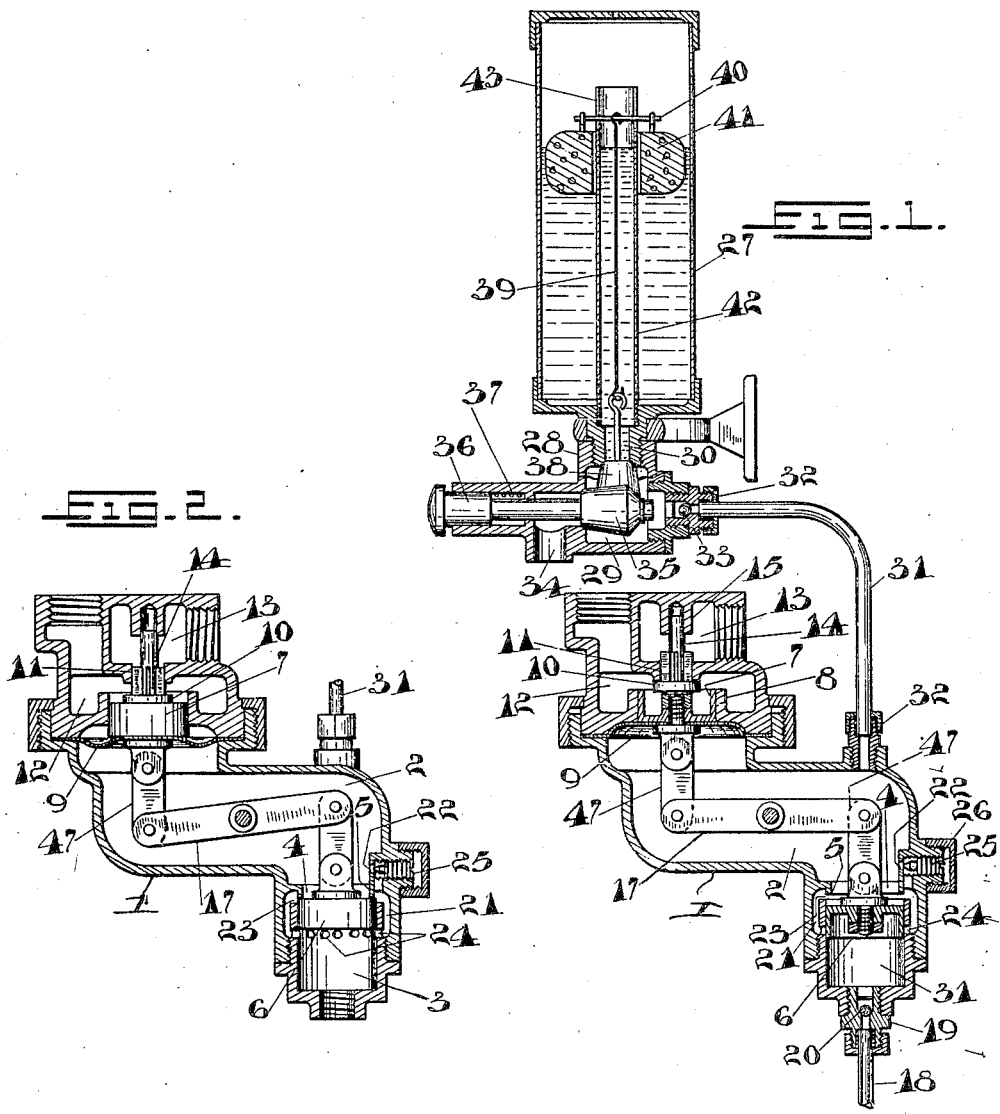

1,451,895

UNITED STATES PATENT OFFICE.

JAMES SANDILANDS, OF TORONTO, ONTARIO, CANADA.

AUTOMATIC VALVE.

Application filed August 9, 1921. Serial No. 491,031.

*To all whom it may concern:*

Be it known that I, JAMES SANDILANDS, of the city of Toronto, in the county of York, Province of Ontario, Canada, a subject of the King of Great Britain, have invented certain new and useful Improvements in Automatic Valves, of which the following is a specification.

This invention relates to valves which are adapted, after being opened, to close automatically after a longer or shorter interval, and my object is to devise a valve of this type in which the pressure of one fluid is adapted to control the flow of another fluid, or of the same fluid in different channels.

I attain my object by means of the constructions hereinafter described and illustrated in the accompanying drawings in which—

Fig. 1 is a longitudinal section of the valve; and

Fig. 2 a similar view of part of the same showing the parts in a different position.

In the drawings like numerals of reference indicate corresponding parts in the different figures.

1 is a valve casing in which is provided the main chamber 2, with which communicates the inlet chamber 3 by means of the opening 4 surrounded by a valve seat 5. The inlet chamber is preferably cylindrical, and in it a member 6, formed as a piston valve, is longitudinally movable. This member 6, it will be seen, is adapted to engage the valve seat 5 which is so proportioned and arranged that, when the member 6 is in contact with it the face of the member 6 exposed through the opening to the main chamber is materially reduced in area. A second movable member 7 is provided, also exposed to the pressure of the fluid within the main chamber. This member is preferably formed as a piston longitudinally movable in a cylinder 8 formed in the casing. A flexible diaphragm 9 suitably connected with the casing and the member 7 serves to prevent any leakage past the member 7. To the member 7 is connected the valve 10, the stem of which passes through an opening 11 forming a communication between the inlet chamber 12 and the fluid outlet chamber 13 formed in the casing. A valve seat is formed at the underside of the opening, which the valve 10 engages to close the communication between the two chambers. This valve is provided with a stem 14 movable in the guide 15. In the main chamber is fulcrumed a lever 17 of the first order. The ends of this lever are pivotally connected with links 47 pivotally connected with the members 6 and 7. The movements of the members 6 and 7 are therefore necessarily simultaneous and in opposite directions. The movement of the members to open and close the valve 10 is obtained through the medium of the following constructions. A supply pipe 18 for fluid under pressure is connected with the inlet chamber 3 by means of an ordinary coupling 19, which also preferably includes a check valve 20. In the wall of the inlet chamber is formed a by-pass 21 having a restricted opening 22 into the main chamber, and also opening by means of a port or ports 23 and port or ports 24 into the inlet chamber. In the preferred arrangement the by-pass is an annular passage, and the ports 24 are formed of a plurality of holes, while the port 23, adjacent the opening 4, is annular in form. The member 6, it will be noted, is so positioned that when it is seated against the valve seat 5 it closes the port 23 and opens the ports 24. Water from the inlet chamber may thus flow through the by-pass and through the restricted opening 22 into the main chamber. As the member moves away from the valve seat 5 it opens the port 23 and closes the ports 24. The capacity of flow through the restricted opening is controllable by means of the needle valve 25, which is threaded through the side of the casing, and is provided with a screw driver slot at its outer end. A screw cap 26 is preferably provided so that the valve is not likely to be meddled with except by skilled persons acquainted with the operation of the valve.

The operation of the parts of the device just described is as follows. The main chamber is normally full of fluid and the member 6 in the position shown in Fig. 1. If, now, exit be provided for fluid from the main chamber, fluid under pressure may enter the inlet chamber 3, thus pressing the member 6 up towards the position shown in Fig. 2. As soon as the ports 24 are uncovered, the fluid passes through the by-pass into the main chamber and tends to restore the pressure therein as soon as the venting of fluid from the main chamber ceases. It is evident that as soon as the pressure in the main chamber rises to slightly above one-half the pressure in the inlet chamber, both the members 6 and 7 will begin to move outwardly, since the area of these members exposed to the pressure in the main chamber is about double that of the area of the member 6 exposed to the pressure in the inlet chamber 3. As soon, however, as the member 6 moves a very slight distance away from the valve seat its area, which is exposed to the pressure in the main chamber, is considerably increased. At the same time, owing to the opening of the port 23, a materially freer flow of fluid is provided for between the inlet chamber and the main chamber. The result is that a very rapid movement of the members 6 and 7 at once takes place and the valve 10 is rapidly closed. This rapid movement of the valve 10 is particularly important when the device is used to control a gas supply. While, for some purposes, fluid may be vented from the main chamber by any suitable manually operated drain cock, I prefer, when the device is to be used with a gas heater, to provide automatic control, so that the valve 10, after it has been opened, will be automatically closed again after the lapse of a predetermined interval of time. For this purpose I provide a control chamber 27. This will usually be a glass cylinder so that the liquid level therein may be observed. This chamber is supported on a suitable casing 28, and is in communication with the valve chamber 29 in the casing by means of the passage-way 30. This valve chamber is connected with the main chamber by means of a pipe 31 connected with the respective chambers by means of ordinary couplings 32. In the coupling, adjacent the valve chamber 29, a check valve 33 is preferably provided. The chamber 29 has an outlet 34 therefrom, the opening between the chamber and the port being formed with a valve seat engageable by a valve plug 35 of the Fuller type. The valve plug is connected with a stem 36 slidable in the casing, and having its outer end formed as a push button. A coil spring 37 engages a shoulder on the stem and a shoulder on the casing and tends to hold the valve plug in the closed position. By pushing in the stem 36 any desired quantity of water may be vented from the control chamber. It is evident that, if one-half the contents of the control chamber have been vented, the pressure in the main chamber 2 will not rise sufficiently to cause the closing movement of the valve 10 until the control chamber has been refilled to the ordinary level, and thereafter the flow into the control chamber stopped. To stop the flow of liquid into the flow chamber when a predetermined level has been reached I provide a float valve adapted to close the passage 30. This float valve comprises the valve plug 38 of the Fuller type adapted to close the passageway from its lower side. The stem of this valve is connected with a rod 39, to the upper end of which is connected a cross bar 40 connected to the annular float 41. This float is guided on a tube 42 extending up from the bottom of the control chamber. Slots 43 are formed in the upper end of this tube to guide the cross bar 40. The upper end of the chamber is, of course, open to the atmosphere.

While this device is mainly applicable for gas heaters to enable the opening of the gas valve to be controlled from any desired point and to automatically close the valve, after a predetermined time, the device may be used in connection with flushing tanks to take the place of ordinary flushometers. It is also evident that various details of the construction may be changed without departing from the spirit of my invention, and that changes may be made in the proportions of various parts to meet any given circumstances. For instance, the rate of closing of the valve 10 may be varied within wide limits by varying the proportions of the movable members 6 and 7, by adjusting the needle valve 25 or varying the proportions of the valve seat 5, the ports and the by-pass.

What I claim as my invention is:—

1. In an automatic valve, the combination of a main chamber; an inlet chamber communicating by means of an opening with the main chamber; a member movable in the inlet chamber adapted to close said opening; a second movable member exposed to the pressure of fluid within the main chamber; means connecting the movable members whereby their movements are necessarily simultaneous and in opposite directions; a by-pass having a restricted opening into the main chamber and two ports into the inlet chamber, the first adjacent the opening between the chambers and the second remote therefrom, the first movable member being adapted to close the first port substantially simultaneously with the opening between the two chambers and to close the second port when moved to uncover the first port; means for venting the pressure in the main chamber; and a valve controllable by the movement of the second movable member.

2. An automatic valve constructed as set forth in claim 1 in which the inlet chamber is a cylinder and the first mentioned movable member is a piston valve movable in the chamber and the opening is provided with a valve seat contactible by the valve and when so contacted adapted to reduce the area of the piston exposed to the pressure within the main chamber.

3. In an automatic valve, the combination of a main chamber; an inlet chamber communicating by means of an opening with the main chamber; a member movable in the inlet chamber adapted to close said opening; a second movable member exposed to the pressure of fluid within the main chamber; means connecting the movable members whereby their movements are necessarily simultaneous and in opposite directions; means whereby when the said opening is closed a restricted flow is provided from one chamber to the other; and means whereby, when the first movable member is moved to open the opening, a relatively free flow is provided from the inlet chamber to the main chamber; means for venting the pressure in the main chamber; and a valve controllable by the movement of the second movable member.

4. An automatic valve constructed as set forth in claim 3 in which the inlet chamber is a cylinder and the first mentioned movable member is a piston valve movable in the chamber and the opening is provided with a valve seat contactible by the valve and when so contacted adapted to reduce the area of the piston exposed to the pressure within the main chamber.

5. In an automatic valve, the combination of a main chamber; an inlet chamber communicating by means of an opening with the main chamber; a member movable in the inlet chamber adapted to close said opening; a second movable member exposed to the pressure of fluid within the main chamber; means connecting the movable members whereby their movements are necessarily simultaneous and in opposite directions; means whereby when the said opening is closed a restricted flow is provided from one chamber to the other; and means whereby, when the first movable member is moved to open the opening, a relatively free flow is provided from the inlet chamber to the main chamber; a control chamber communicating with the main chamber; a float valve adapted to control said communication; and a drain valve whereby water may be withdrawn from the chamber.

6. In an automatic valve, the combination of a main chamber; an inlet chamber communicating by means of an opening with the main chamber; a member movable in the inlet chamber adapted to close said opening; a second movable member exposed to the pressure of fluid with the main chamber; means connecting the movable members whereby their movements are necessarily simultaneous and in opposite directions; means whereby when the said opening is closed a restricted flow is provided from one chamber to the other; a control chamber communicating with the main chamber; a float valve adapted to control said communication; and a drain valve whereby water may be withdrawn from the chamber.

7. In an automatic valve, the combination of a main chamber; an inlet chamber communicating by means of an opening with the main chamber; a member movable in the inlet chamber adapted to close said opening; a second movable member exposed to the pressure of fluid within the main chamber; means connecting the movable members whereby their movements are necessarily simultaneous and in opposite directions; means whereby when said opening is closed a restricted flow is provided from one chamber to the other; means whereby when the said opening is open that area of the first movable member exposed to the pressure in the main chamber is greater than when the opening is closed; means for venting the pressure in the main chamber; and a valve controllable by the movement of the second movable member.

8. In an automatic valve, the combination of a main chamber; an inlet chamber communicating by means of an opening with the main chamber; a member movable in the inlet chamber adapted to close said opening; a second movable member exposed to the pressure of fluid within the main chamber; means connecting the movable members whereby their movements are necessarily simultaneous and in opposite directions; means whereby when the said opening is closed a restricted flow is provided from one chamber to the other; means for regulating said restricted flow; and means whereby, when the first movable member is moved to open the opening, a relatively free flow is provided from the inlet chamber to the main chamber; means for venting the pressure in the main chamber; and a valve controllable by the movement of the second movable member.

9. In an automatic valve, the combination of a main chamber; an inlet chamber communicating by means of an opening with the main chamber; a member movable in the inlet chamber adapted to close said opening; a second movable member exposed to the pressure of fluid within the main chamber; means connecting the movable members whereby their movements are necessarily simultaneous and in opposite directions; a by-pass having a restricted opening into the main chamber and two ports into the inlet chamber, the first adjacent the opening between the chambers and the second remote therefrom, the first movable member being adapted to close the first port substantially simultaneously with the opening between the two chambers and to close the second port when moved to uncover the first port; means for varying the flow capacity of said restricted opening; means for venting the pressure in the main chamber; and a valve controllable by the movement of the second movable member.

10. In an automatic valve, the combination of a main chamber; an inlet chamber communicating by means of an opening with the main chamber; a member movable in the inlet chamber adapted to close said opening; a second movable member exposed to the pressure of fluid within the main chamber; means connecting the movable members whereby their movements are necessarily simultaneous and in opposite directions; means whereby when said opening is closed a restricted flow is provided from one chamber to the other; means for regulating said restricted flow; means whereby when the said opening is open the area of the first movable member exposed to the pressure in the main chamber is greater than when the opening is closed; means for venting the pressure in the main chamber; and a valve controllable by the movement of the second movable member.

11. In an automatic valve, the combination of a main chamber; an inlet chamber communicating by means of an opening with the main chamber; a member movable in the inlet chamber adapted to close said opening; a second movable member exposed to the pressure of fluid within the main chamber; means connecting the movable members whereby their movements are necessarily simultaneous and in opposite directions; a by-pass between the two chambers, the first movable member being adapted to open the by-pass when it closes the opening between the two chambers; means for venting the pressure in the main chamber; and a valve controllable by the movement of the second movable member.

12. In an automatic valve, the combination of a main chamber; an inlet chamber communicating by means of an opening with the main chamber; a member movable in the inlet chamber adapted to close said opening; a second movable member exposed to the pressure of fluid within the main chamber; means connecting the movable members whereby their movements are necessarily simultaneous and in opposite directions; a by-pass between the two chambers, the first movable member being adapted to open the by-pass when it closes the opening between the two chambers; means for varying the flow capacity of the by-pass; means for venting the pressure in the main chamber; and a valve controllable by the movement of the second movable member.

Signed at Toronto this 16th day of July, 1921.

JAMES SANDILANDS.

Witnesses:
JNO. L. SCHOLES,
H. E. HALL.